United States Patent
Sumi et al.

(10) Patent No.: US 6,922,152 B2
(45) Date of Patent: Jul. 26, 2005

(54) PASSENGER WEIGHT MEASURING APPARATUS

(75) Inventors: Chiaki Sumi, Aichi (JP); Koji Aoki, Aichi (JP); Morio Sakai, Aichi (JP); Osamu Fujimoto, Aichi (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 96 days.

(21) Appl. No.: 10/103,838

(22) Filed: Mar. 25, 2002

(65) Prior Publication Data
US 2002/0154020 A1 Oct. 24, 2002

(30) Foreign Application Priority Data
Mar. 23, 2001 (JP) ..................................... P2001-086193

(51) Int. Cl.[7] .............................................. G08B 21/00
(52) U.S. Cl. .................. 340/666; 340/665; 340/667; 340/668; 280/730.1; 280/735; 73/862.381
(58) Field of Search ............................. 340/665–668; 280/735, 273, 730.1; 73/862.381; 180/167, 290, 730.1, 273, 272.2

(56) References Cited
U.S. PATENT DOCUMENTS 6,264,236 B1 * 7/2001 Aoki ........................ 280/735
6,490,515 B1 * 12/2002 Okamura et al. ............. 701/49
6,563,429 B2 * 5/2003 Sakai et al. ................. 340/667
6,571,647 B1 * 6/2003 Aoki et al. ............ 73/862.381

FOREIGN PATENT DOCUMENTS

| JP | 5-147491 A | 6/1993 |
| JP | 11-337393 A | 12/1999 |
| JP | 11-351952 A | 12/1999 |
| JP | 2000-290700 | * 9/2000 |
| JP | 2000-298057 A | 10/2000 |

* cited by examiner

*Primary Examiner*—Julie Bichngoc Lieu
(74) *Attorney, Agent, or Firm*—Burns, Doane, Swecker & Mathis, LLP (57) ABSTRACT

In a passenger weight measuring apparatus, each of bend parts of front and rear brackets for supporting a seat to a vehicle main body side becomes bent and deformed in response to the load applied by the weight of the passenger sit in the seat. A load sensor on each the bend part detects the load based on the bend deformation and outputs a voltage signal of magnitude responsive to the load to a signal processor. The processor generates a load detection signal clamped in the voltage range corresponding to a preset passenger weight load range from the voltage signal and outputs the load detection signal to an output terminal. When the detected load is a collision load set in a load region out of the load range, the processor outputs an abnormal load detection signal different from the load detection signal to the same output terminal.

18 Claims, 5 Drawing Sheets

PASSENGER WEIGHT MEASURING APPARATUS

BACKGROUND OF THE INVENTION

1. Field of the Invention

This invention relates to a passenger weight measuring apparatus for detecting the weight of a passenger sitting in a seat of a vehicle.

2. Description of the Related Art

Hitherto, an attempt has been made to control an air bag system or an emergency restraint system for a seat belt installed in a vehicle in response to the physique of a passenger. As the attempt, for example, the weight of the passenger is measured with a weight measuring apparatus placed in a seat and the expansion gas amount and the expansion speed of the air bag are adjusted or the pretension of the seat belt is adjusted in response to the measured weight.

Figure 8:
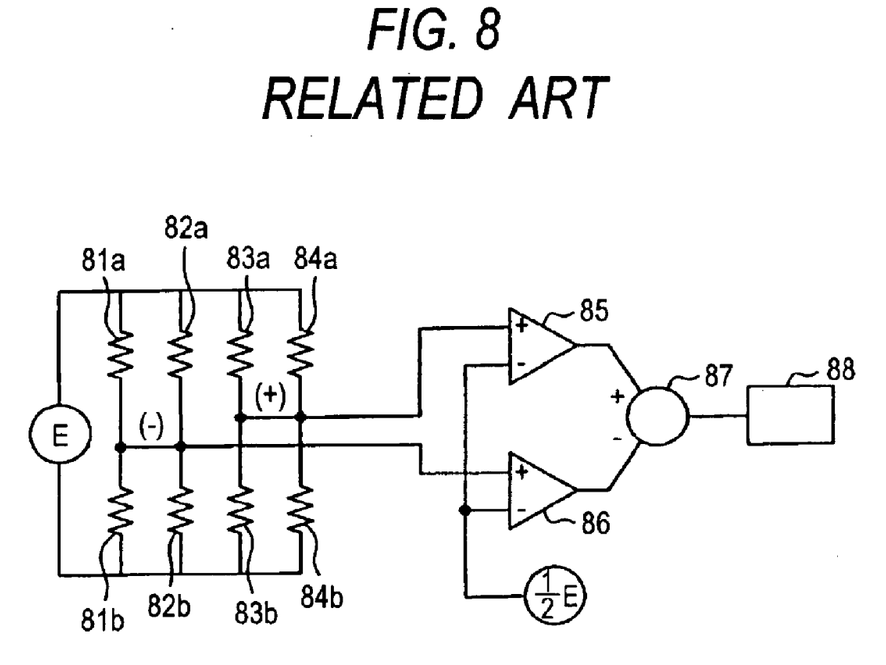
FIG. 8 is a circuit diagram to show the electric configuration of a seat weight measuring apparatus in a related art.

As the weight measuring apparatus, for example, JP-A-11-337393 discloses an apparatus. In the weight measuring apparatus, load sensors 81a, 81b, 82a, and 82b placed back and forth in the left of a seat and load sensors 83a, 83b, 84a, and 84b placed back and forth in the right of the seat output voltage signals responsive to the loads added to the sensors in response to the weight of the passenger sitting in the seat, as shown in FIG. 8. Each of the load sensors 81a, 81b to 84a, and 84b includes a resistor strain gauge put on a sensor plate (skew member) bent upon application of a load, and outputs a voltage signal changing in response to the resistance value change amount accompanying the bend deformation of the sensor plate responsive to the load. The difference value between the voltage signal output by the left load sensors 81a, 81b, 82a, and 82b and reference voltage E/2 is found by a differential amplifier 85, and the difference value between the voltage signal output by the right load sensors 83a, 83b, 84a, and 84b and the reference voltage E/2 is found by a differential amplifier 86. Further, the voltage difference between both the difference values is found by an adder-subtracter 87. A weight calculation section 88 finds the weight of the passenger from the voltage difference.

However, the sensor plate on which the resistor strain gauge is placed is designed for the strength capable of measuring the weight of the passenger with good sensitivity and thus if the vehicle collides and a large shock is applied, an excessive load is applied to the sensor plate and the sensor plate may becomes abnormally deformed. In this case, the sensitivity of the load sensor deviates and it may become impossible to measure the weight of the passenger with good accuracy.

Thus, applying such a shock abnormally deforming the sensor plate to the vehicle is detected and when the shock is detected, the driver or the passenger needs to be informed that it is made impossible to normally control the air bag, etc., based on the weight of the passenger or the fact needs to be stored in a storage unit for inspection.

To solve such a problem, it is considered that a shock detector for detecting applying such a shock abnormally deforming the sensor plate to the vehicle is provided in addition to the weight measuring apparatus.

As such a shock detector, it is possible to use an air bag start control unit proposed in JP-A-5-147491, for example. When a shock such that the control unit operates for starting the air bag is applied to the vehicle, it is determined that the sensor plates of the load sensors become abnormally deformed.

However, such a unit operates in response to a considerably large shock detected for starting the air bag. Thus, when the shock applied to the vehicle is weak as in a collision at low speed and the weight of the passenger is heavy, a state in which abnormal deformation of the sensor plate cannot be detected occurs although an excessive load is imposed on the sensor plate.

SUMMARY OF THE INVENTION

It is therefore an object of the invention to provide a passenger weight measuring apparatus that can more reliably detect an abnormal load being applied to a load detection part because of a collision, etc.

To the end, according to a first aspect of the invention, there is provided a passenger weight measuring apparatus including a load detector for detecting the distortion deformation amount of a load deformation body to which a load based on the weight of a passenger is applied, the load deformation body becoming elastically deformed according to the distortion deformation amount responsive to the magnitude of the applied load, and generating and outputting a load detection signal corresponding to the load from the distortion deformation amount, and an abnormal load detector for outputting an abnormal load detection signal in a state in which the abnormal load detection signal can be distinguished from the load detection signal when an abnormal load set in a load region out of a preset passenger weight load detection range for the load is applied to the load deformation body. The expression "outputting an abnormal load detection signal in a state in which the abnormal load detection signal can be distinguished from the load detection signal" contains at least outputting the abnormal load detection signal that can be distinguished from the load detection signal to the output terminal to which the load detection signal is output and outputting the abnormal load detection signal that cannot be distinguished from the load detection signal to an output terminal different from the output terminal to which the load detection signal is output.

In the first aspect of the invention, the load detector detects the load applied to the load deformation body based on the weight of the passenger and the acceleration applied to the passenger and the seat because of a collision, etc., and outputs a load detection signal corresponding to the detected load. When the load applied to the load deformation body is an abnormal load set in the load region out of the preset passenger weight load detection range, the abnormal load detector outputs the abnormal load detection signal in a state in which the abnormal load detection signal can be distinguished from the load detection signal. Thus, even if a weak shock is applied to the vehicle as in a collision at low speed and the load based on the weight of the passenger is a load value close to the upper or lower limit value of the passenger weight load detection range, when an abnormal load is applied to the load detection part, the abnormal load detection signal is output. Therefore, an abnormal load out of the preset passenger weight load detection range being applied the load deformation body is detected more reliably.

According to a second aspect of the invention, in the first aspect of the invention, the abnormal load detection signal is a signal that can be distinguished from the load detection signal and the abnormal load detector outputs the abnormal load detection signal to an output terminal to which the load detector outputs the load detection signal.

In the second aspect of the invention, in addition to the function of the first aspect of the invention, the number of wirings for electrically connecting to the output object is lessened as compared with the case where the load detection signal and the abnormal load detection signal are output to separate output terminals. Therefore, the connector of wiring for connecting each connection part of the sense apparatus and the output destination may be smaller.

According to a third aspect of the invention, in the second aspect of the invention, the abnormal load detector includes a comparison determination circuit for determining whether or not the load detection signal is out of the signal range corresponding to the passenger weight load detection range by comparing the load detection signal with a preset reference signal and outputting a determination signal corresponding to the determination result, and an output circuit being responsive to the determination signal for outputting the load detection signal to the output terminal when the load detection signal is within the signal range and outputting the abnormal load detection signal to the output terminal when the load detection signal is out of the signal range.

In the third aspect of the invention, in addition to the function of the second aspect of the invention, the comparison determination circuit determines whether or not the load detection signal is out of the signal range by comparing the load detection signal with the preset reference signal. The output circuit outputs either of the load detection signal and the abnormal load detection signal to the output terminal based on the determination result of the comparison determination circuit.

According to a fourth aspect of the invention, in the third aspect of the invention, the output circuit includes a switching element for performing switching operation in response to the determination signal and when the load detection signal is out of the signal range, the switching element outputs a power supply potential signal or a ground potential signal to the output terminal as the abnormal load detection signal.

In the fourth aspect of the invention, in addition to the function of the third aspect of the invention, the switching element performs switching operation in response to the determination signal output by the comparison determination circuit. When the load detection signal is out of the signal range, the switching element outputs the power supply potential signal or the ground potential signal as the abnormal load detection signal.

According to a fifth aspect of the invention, the passenger weight measuring apparatus of the second aspect of the invention further includes a clamp circuit for clamping the load detection signal output by the load detector in the signal range corresponding to the passenger weight load detection range, wherein the abnormal load detector outputs the abnormal load detection signal as a signal out of the signal range.

In the fifth aspect of the invention, in addition to the function of the second aspect of the invention, the load detection signal clamped in the signal range corresponding to the passenger weight load detection range is generated by the clamp circuit. On the other hand, the abnormal load detection signal is output to the same output terminal as an electric signal out of the signal range. Thus, the load detection signal can be output in a larger signal range within one output signal range. Therefore, the resolution of the load detection signal can be made higher.

According to a sixth aspect of the invention, in the first aspect of the invention, the load deformation body is a support member for supporting a seat in which a passenger sits to the vehicle main body side and the load detector is a resistor strain gauge placed on the support member.

In the sixth aspect of the invention, in addition to the function of the first aspect of the invention, the resistor strain gauge detects the load applied to the support member of the seat based on the weight of the passenger and the acceleration or deceleration of the vehicle as the support member becomes distorted and deformed.

According to a seventh aspect of the invention, there is provided a passenger weight measuring apparatus including a load deformation body being distorted and deformed upon application of a load thereto, a load detector for detecting the load from the distortion deformation amount occurring on the load deformation body, and an abnormal load detector for setting a passenger weight load range for the load from the load detector, outputting a first load detection signal responsive to the load if the load from the load detector is in the passenger weight load range, outputting a second load detection signal provided by clamping the first load detection signal when a positive load of a predetermined load from the upper limit value of the passenger weight load range is detected or when a negative load of a predetermined load from the lower limit value of the passenger weight load range is detected, and outputting a third load detection signal which becomes a power supply potential signal or a ground potential signal when any other load is detected.

In the seventh aspect of the invention, when the load applied to the load deformation body is a positive abnormal load larger than the upper limit value of the predetermined passenger weight load range by a predetermined load or more or is a negative abnormal load larger than the lower limit value of the predetermined passenger weight load range by a predetermined load or more, a power supply potential signal or a ground potential signal different from that in the predetermined load range containing the passenger weight load range is output. Thus, if the load applied to the load deformation body in response to the weight of the passenger is not an abnormal load, when the load applied to the load deformation body becomes an abnormal load because of the acceleration, etc., applied to the vehicle, a signal different from the signal output when the normal load is applied is output.

According to an eighth aspect of the invention, there is provided a passenger weight measuring apparatus including a load deformation body being distorted and deformed upon application of a load thereto, a load detector for detecting the load from the distortion deformation amount occurring on the load deformation body, and an abnormal load detector for setting for the load a passenger weight load range assumed to be a passenger weight load and an abnormal load range in which a positive load out of the upper limit value of the passenger weight load by a predetermined load is detected or a negative load out of the lower limit value of the passenger weight load by a predetermined load is detected, and outputting to an output terminal an abnormal load detection signal different from a load detection signal changing with the distortion deformation amount in the passenger weight load range if a load in the abnormal load range is detected.

In the eighth aspect of the invention, when the load applied to the load deformation body is in an abnormal load range out of the predetermined load range containing the passenger weight load range, an abnormal load detection signal different from a load detection signal responsive to the passenger weight load is output. Thus, if the load applied to the load deformation body in response to the weight of the passenger is not an abnormal load, when the load applied to the load deformation body becomes an abnormal load because of the acceleration, etc., applied to the vehicle, a signal different from the signal output when the normal load is applied is output.

According to a ninth aspect of the invention, the abnormal load detector includes a comparison determination circuit for comparing the load from the distortion deformation amount with a reference signal and outputting a determination signal if the load is determined to be in the abnormal load range, and an output circuit for outputting the abnormal load detection signal to the output terminal if the load is in the abnormal load range.

In the ninth aspect of the invention, if the comparison determination circuit determines that the load is in the abnormal load range from the comparison result of the load from the distortion deformation amount with the reference signal, the comparison determination circuit outputs a determination signal. If the load is determined to be in the abnormal load range based on the determination signal, the output circuit outputs the abnormal load detection signal to the output terminal.

According to a tenth aspect of the invention, the output circuit includes a switching element for performing switching operation in response to the determination signal and if the load is in the abnormal load range, the switching element outputs a power supply potential signal or a ground potential signal to the output terminal as the abnormal load detection signal.

In the tenth aspect of the invention, the switching element which performs switching operation in response to the determination signal output by the comparison determination circuit outputs the power supply potential signal or the ground potential signal as the abnormal load detection signal if the load is in the abnormal load range.

According to an eleventh aspect of the invention, the abnormal load detector further includes a clamp circuit for placing a load between the passenger weight load range and the abnormal load range in a load detection signal range.

In the eleventh aspect of the invention, when the load applied to the load deformation body is out of the passenger weight load range and is not an abnormal load, a load detection signal corresponding to the upper or lower limit value of the passenger weight load range is output. Thus, the signal range of the load detection signal corresponding to the passenger weight load range can be set larger within the limited signal range. Subsequently, the resolution of the load detection signal can be made higher.

According to a twelfth aspect of the invention, the load deformation body is a support member for supporting a seat in which a passenger sits to the vehicle main body side and the load detector is a resistor strain gauge placed on the support member.

In the twelfth aspect of the invention, the resistor strain gauge detects the load applied to the support member of the seat based on the weight of the passenger and the acceleration or deceleration of the vehicle as the support member becomes distorted and deformed.

DETAILED DESCRIPTION OF THE PREFERRED EMBODIMENTS

Now, a description will be given in more detail of preferred embodiments of the invention with reference to the accompanying drawings.

A first embodiment of the invention will be discussed with reference to FIGS. 1 to 5.

Figure 2:
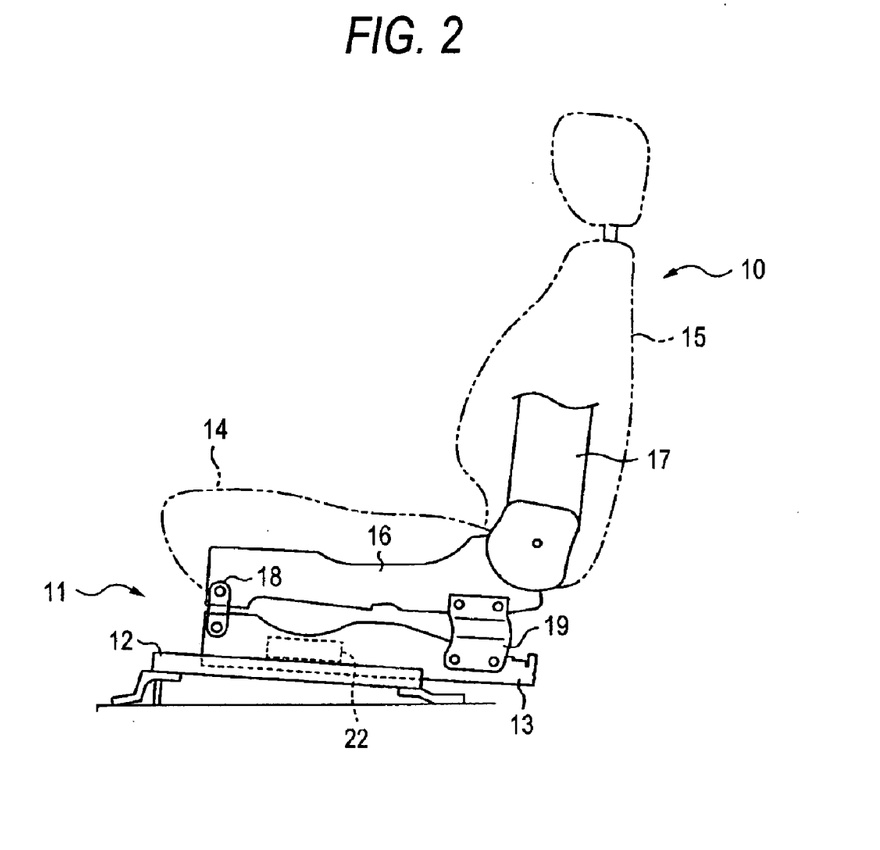
FIG. 2 is a schematic side view to show a seat and a slide mechanism.

As shown in FIG. 2, a seat 10 in which a passenger sits is placed on a floor in a cabin of a vehicle. The seat 10 is supported so that the position can be adjusted in a back and forth direction of the vehicle by a slide mechanism 11 placed on the floor.

The slide mechanism 11 includes a pair of left and right lower rails 12 and a pair of left and right upper rails 13. However, FIG. 2 shows only the left lower rail 12 and the left upper rail 13. Both lower rails 12 are fixed on the floor so as to extend in the back and forth direction of the vehicle. The upper rails 13 are engaged in the lower rails 12 on the upper sides thereof so as to extend back and forth and are movably guided back and forth.

The seat 10 includes a seat part 14 and a seat back rest part 15. The seat part 14 contains a seat cushion frame 16 and the seat back rest part 15 contains a seat back frame 17. The seat 10 is fixed as the seat cushion frame 16 is joined to the upper rails 13 by front brackets 18 and rear brackets 19 at the left and right of the seat 10. However, FIG. 2 shows only the left front bracket 18 and the left rear bracket 19. In the embodiment, the front brackets 18 and the rear brackets 19 are load deformation bodies and support members.

Figure 3A:
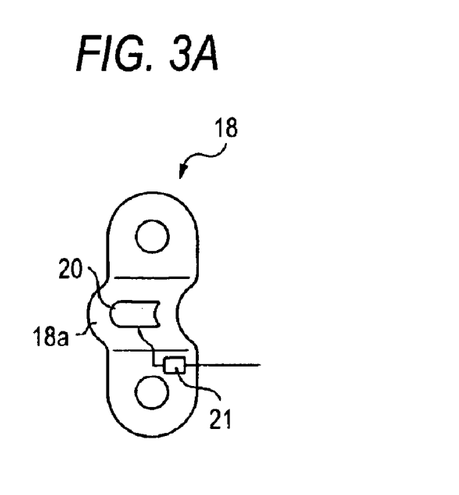
FIG. 3A is a front view of a front bracket and FIG. 3B is a front view of a rear bracket.

As shown in FIG. 3A, the front bracket 18 is formed with a bend part 18a bent and elastically deformed. The bend part 18a is formed so that it becomes elastically deformed according to the bend deformation amount responsive to the magnitude of the load applied to the bend part 18a based on the weight of the passenger sit in the seat 10. The bend part 18a is formed so that it becomes elastically deformed without becoming abnormally deformed when a load is applied within a preset passenger weight load range. The passenger weight load range is the detection load range applied to a load sensor 20 in response to the position where the load sensor 20 is placed corresponding to the weight range of the passenger assumed to sit in the seat 10, for example.

The bend part 18a is provided with the load sensor 20 for generating a voltage signal based on the bend deformation amount of the bend part 18a. The front bracket 18 is provided with a signal processor 21 implemented as an IC in a part out of the bend part 18a. The load sensor 20 is electrically connected to the signal processor 21. Likewise, the right front bracket 18 (not shown) is also provided with a load sensor 20 and a signal processor 21.

Figure 3B:
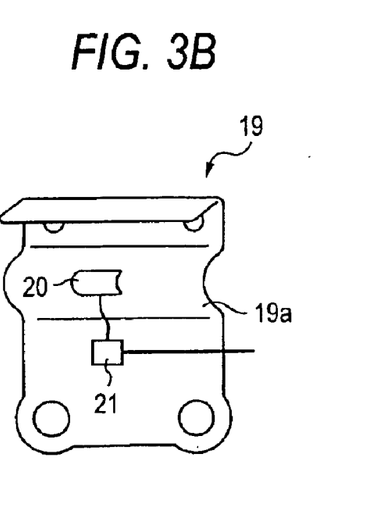

Like the front bracket 18, the rear bracket 19 is formed with a bend part 19a bent and elastically deformed. Like the bend part 18a, the bend part 19a is formed so that it becomes elastically deformed according to the bend deformation amount responsive to the magnitude of the load applied to the bend part 19a.

Like the bend part 18a, the bend part 19a is provided with a load sensor 20, which is electrically connected to a signal processor 21 placed in the proximity of the load sensor 20. Likewise, the right rear bracket 19 (not shown) is also provided with a load sensor 20 and a signal processor 21.

As shown in FIG. 2, an electronic control unit (ECU) 22 for finding the weight of the passenger from the loads detected by the four load sensors 20 is placed below the seat part 14 of the seat 10. The ECU 22 is electrically connected to an electronic control unit (not shown) for controlling actuating an air bag system, for example. In the embodiment, the load sensors 20, the signal processors 21, and the ECU 22 make up a passenger weight measuring apparatus.

Next, the electric configuration of the embodiment will be discussed.

A reference voltage VS is supplied to each load sensor 20 from the ECU 22 through the signal processor 21 placed on the corresponding bracket 18, 19 and the load sensor 20 is connected to a grounding terminal of the ECU 22 through the signal processor 21.

Each load sensor 20 detects the load applied in response to the weight of the passenger sit in the seat 10, generates a voltage signal of the magnitude corresponding to the magnitude of the detected load from the reference voltage VS, and outputs the voltage signal to the signal processor 21.

Each signal processor 21 inputs the voltage signal from the load sensor 20 placed on the corresponding bracket 18, 19, converts the voltage signal into a voltage signal in a given voltage range, and outputs the provided voltage signal to the ECU 22.

The ECU 22 finds the weight of the passenger sit in the seat 10 from the loads detected by the four load sensors 20. The ECU 22 generates a control signal based on the found weight and outputs the control signal to an electronic control unit for air bag control.

Next, the load sensor 20 and the signal processor 21 will be discussed in detail. The load sensors 20 have the same configuration and the signal processors 21 have the same configuration.

Figure 1:
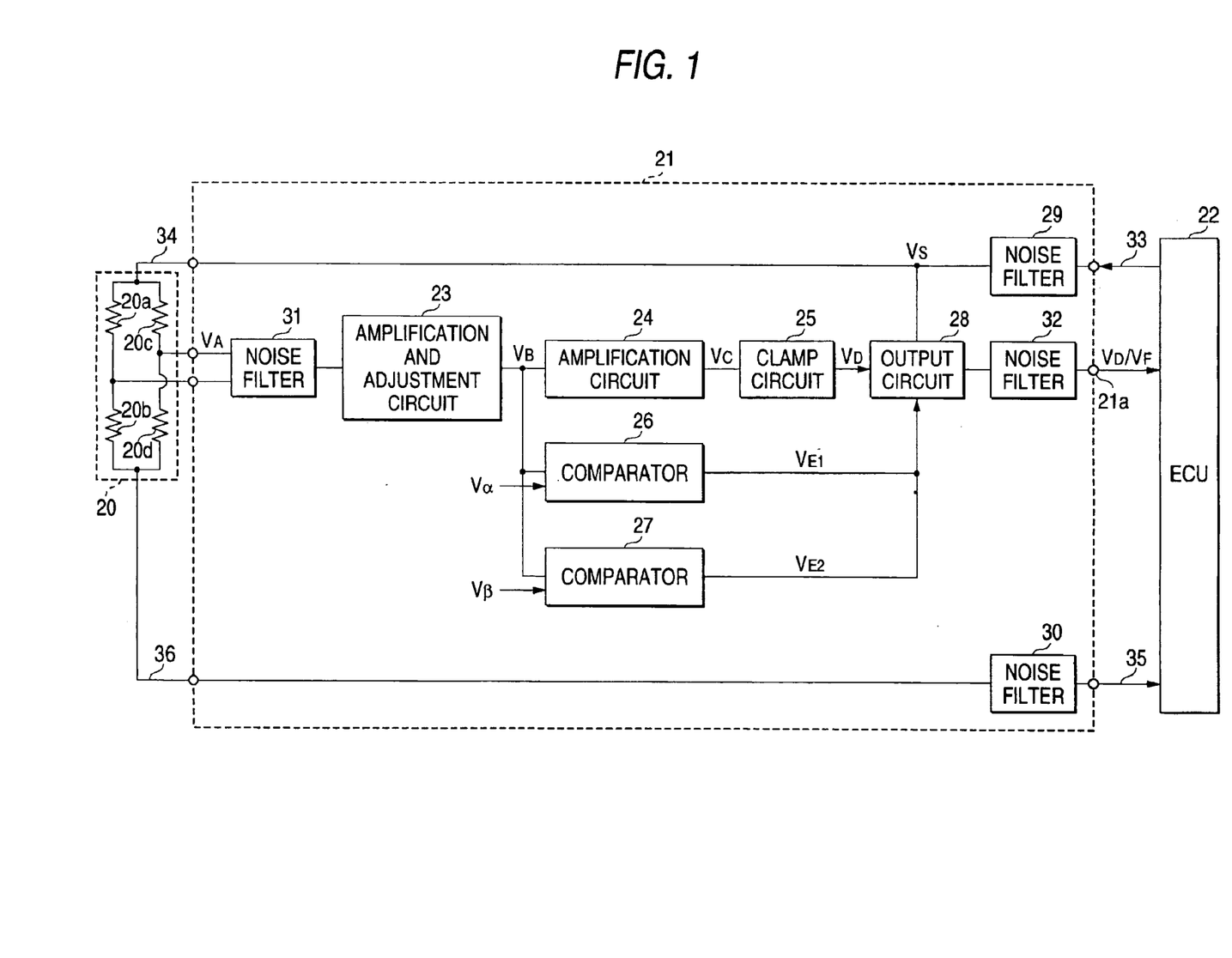
FIG. 1 is a schematic diagram to show the configuration of a passenger weight detection apparatus of a first embodiment of the invention.

The load sensor 20 is a resistor strain gauge and includes four resistors 20a, 20b, 20c, and 20d as bridge connection, as shown in FIG. 1. A pair of resistors 20a and 20b connected in series and a pair of resistors 20c and 20d connected in series are placed in parallel and the reference voltage VS is applied across the ends. The load sensor 20 generates a voltage signal VA corresponding to the change in the resistance value responsive to the bend deformation amount of the bend part 18a between the midpoint of the resistors 20a and 20b and the midpoint of the resistors 20c and 20d. The load sensor 20 outputs an almost linear voltage signal VA relative to the load within the passenger weight load range.

As shown in FIG. 1, the signal processor 21 is made up of an amplification and adjustment circuit 23, an amplification circuit 24, a clamp circuit 25, a comparator 26, a comparator 27, an output circuit 28, noise filters 29 to 32, etc. The noise filters 29 to 32 block noise entered from the outsides of the load sensor 20 and the signal processor 21. In the embodiment, the load sensor 20, the amplification and adjustment circuit 23, and the amplification circuit 24 make up a load detector. The comparators 26 and 27 and the output circuit 28 make up an abnormal load detector. Both the comparators 26 and 27 make up a comparison determination circuit.

A power line 33 from the ECU 22 is connected to the signal processor 21 for supplying the reference voltage VS through the noise filter 29 to the signal processor 21. The reference voltage VS is a voltage for the ECU 22 to generate a voltage signal input from the signal processor 21; for example, it is 5V. The signal processor 21 also supplies the reference voltage VS to the power supply side of the load sensor 20 via a power line 34. A ground line 35 from the ECU 22 is connected to a ground line of the signal processor 21 through the noise filter 30. The ground side of the load sensor 20 is connected to the ground line of the signal processor 21 via a ground line 36.

The amplification and adjustment circuit 23 inputs the voltage signal VA output by the load sensor 20 through the noise filter 31, amplifies the voltage signal VA, generates a voltage signal VB subjected to zero point adjustment and sensitivity adjustment, and outputs the voltage signal VB to the amplification circuit 24 and the comparators 26 and 27.

The amplification circuit 24 inputs the voltage signal VB, amplifies the voltage signal VB to generate a voltage signal VC, and output the voltage signal VC to the clamp circuit 25. The amplification circuit 24 amplifies the voltage range of the voltage signal VB output by the amplification and adjustment circuit 23 corresponding to the passenger weight load range to the voltage range within the reference voltage VS, appropriate for outputting to the ECU 22.

The clamp circuit 25 clamps the voltage signal VC output by the amplification circuit 24 in the signal range corresponding to the passenger weight load range and outputs. In the embodiment, the clamp circuit 25 outputs a load detection signal VD of a voltage signal provided by clamping the voltage signal VC equal to or less than a lower limit voltage V1 set to a value close to the ground potential and equal to or more than an upper limit voltage V2 set to a value close to the reference voltage VS. In the embodiment, the load detection signal VD is a first load detection signal and the lower limit voltage V1 and the upper limit voltage V2 are both second load detection signals.

When the voltage signal VB input from the amplification and adjustment circuit 23 is equal to or more than a preset reference voltage Vα, the comparator 26 outputs a low-potential determination signal VE1 to the output circuit 28. When the voltage signal VB is less than the reference voltage Vα, the comparator 26 outputs a high-potential determination signal VE1 to the output circuit 28. The reference voltage Vα is generated from the reference voltage VS and is set to a voltage value of the voltage signal VB corresponding to a positive load value larger than the upper limit value of the passenger weight load range by a given value. That is, the voltage value is a value larger than the voltage value of the voltage signal VB when the voltage signal VC becomes the upper limit voltage V2. The reference voltage Vα is set for determining that an excessive positive load exceeding the upper limit value of the passenger weight load range is applied.

When the voltage signal VB input from the amplification and adjustment circuit 23 is equal to or more than a preset reference voltage Vβ (<Vα), the comparator 27 outputs a high-potential determination signal VE2 to the output circuit 28. When the voltage signal VB is less than the reference voltage Vβ, the comparator 27 outputs a low-potential determination signal VE2 to the output circuit 28. The reference voltage Vβ is generated from the reference voltage VS and is set to a voltage value of the voltage signal VB corresponding to an excessive negative load value lower than the lower limit value of the passenger weight load range by a given value. That is, the voltage value is a value smaller than the voltage value of the voltage signal VB when the voltage signal VC becomes the lower limit voltage V1. The reference voltage Vβ is set for determining that an excessive negative load below the lower limit value of the passenger weight load range is applied.

Figure 4:
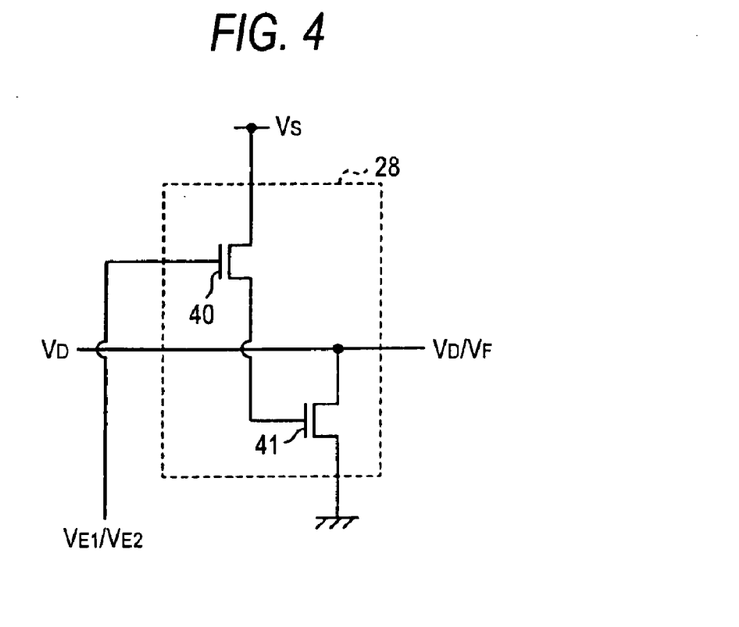
FIG. 4 is a schematic circuit diagram of an output circuit in the first embodiment of the invention.

The output circuit 28 includes a p-channel field effect transistor (PFET) 40 and an n-channel field effect transistor (NFET) 41 for performing switching operation according to the determination signals VE1 and VE2 output by the comparators 26 and 27, as shown in FIG. 4. In the embodiment, the PFET 40 and the NFET 41 are switching elements. The PFET 40 may be a p-channel switching element and the NFET 41 may be an n-channel switching element.

The PFET 40 has a drain connected to a power line and a source connected to the gate of the NFET 41. The PFET 40 has a gate connected to the outputs of the comparators 26 and 27. The NFET 41 has a drain connected to the output of the clamp circuit 25 and a source connected to a ground line. When either of the determination signals VE1 and VE2 is a low potential, the PFET 40 is turned on and the NFET 41 is turned on. When the determination signals VE1 and VE2 are a high potential, the PFET 40 is turned off and the NFET 41 is turned off.

When the determination signals VE1 and VE2 are a high potential, the output circuit 28 outputs the load detection signal VD output by the clamp circuit 25 to an output terminal 21a. When either of the determination signals VE1 and VE2 is a low potential, the output circuit 28 outputs an abnormal load signal VF (almost ground potential) to the output terminal 21a. The abnormal load signal VF becomes a voltage value of about 0.2 V or less due to a voltage drop in the NFET 41. In the embodiment, the ground-potential abnormal load signal VF is a third load detection signal.

Figure 5:
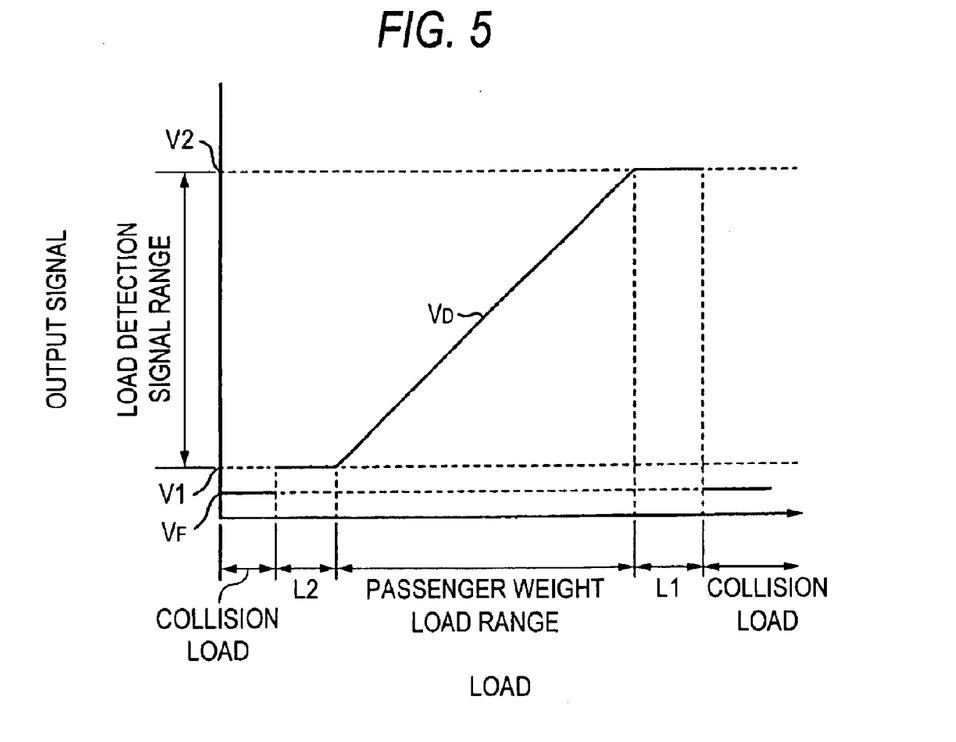
FIG. 5 is a graph to show a schematic characteristic of output signal-load of a passenger weight measuring apparatus in the first embodiment of the invention.

When the load applied to the corresponding load sensor 20 in response to the weight of the passenger sit in the seat 10 is a load within the present passenger weight load range, the described signal processor 21 outputs a load detection signal VD which becomes a value in the voltage range of the lower limit voltage V1 to the upper limit voltage V2, as shown in FIG. 5.

When the load applied to the corresponding load sensor 20 is a collision load set as a positive load region equal to or more than the load value larger than the upper limit value of the passenger weight load range by a load value L1 on the positive side, the signal processor 21 outputs an abnormal load signal VF smaller than the lower limit voltage V1. Likewise, when the load is a collision load set as a negative load region equal to or more than the load value larger than the lower limit value of the passenger weight load range by a load value L2 on the negative side, the signal processor 21 also outputs an abnormal load signal VF. The load detection range of the load value L1 exceeding the passenger weight load range and the load detection range of the load value L2 below the passenger weight load range are provided so as not to determine that the collision load is applied when the load detected by the load sensor 20 is increased or decreased and is placed out of the passenger weight load range because of acceleration applied to the passenger and the seat 10 accompanying hard acceleration or hard braking of the vehicle.

The ECU 22 inputs the load detection signals VD output by the signal processors 21 based on the loads detected by the load sensors 20 when a passenger sits in the seat 10. It calculates the weight of the passenger from the values of the input load detection signals VD. When the ECU 22 inputs the abnormal load signal VF from any of the signal processors 21, it inhibits control of the air bag system based on the weight of the passenger measured by the weight measuring apparatus, for example, and allows control to be performed based only on the acceleration at the collision time detected separately. The ECU 22 causes an electronic control unit for self-diagnosis to record the fact that there is a possibility that the front bracket 18 or the rear bracket 19 may become abnormally deformed due to an excessive load and the reliability of the weight measured by the weight measuring apparatus is degraded, for example.

Next, the function of the embodiment described above will be discussed.

When a passenger sits in the seat 10, the load responsive to the weight of the passenger is applied to the brackets 18 and 19 and the bend parts 18a and 19a of the brackets 18 and 19 become elastically deformed according to the bend deformation amount responsive to the magnitude of the applied load. Then, the load sensor 20 placed on each of the bend parts 18a and 19a of the brackets 18 and 19 outputs the voltage signal VA of the magnitude responsive to the bend deformation amount to the corresponding signal processor 21.

When the vehicle normally runs, each signal processor 21 generates the load detection signal VD of the magnitude corresponding to the load detected by the corresponding load sensor 20 from the input voltage signal VA and outputs the generated load detection signal VD to the ECU 22.

When the vehicle collides, the load applied to each of the bend parts 18a and 19a of the brackets 18 and 19 based on the weight of the passenger and the acceleration applied to the seat 10 because of the collision is detected by the corresponding load sensor 20. At this time, each signal processor 21 outputs an abnormal load signal VF to the output terminal 21a when the magnitude of the load applied to the corresponding load sensor 20 becomes a collision load. For example, if the vehicle collides at low speed and the acceleration is not so large and the airbag system is not actuated, the signal processor 21 outputs the abnormal load signal VF when the weight of the passenger is close to the upper limit value of the passenger weight load range and the load detected by the load sensor 20 becomes a collision load exceeding the upper limit value of the passenger weight load range plus L1. Likewise, if the air bag system is not actuated, the signal processor 21 also outputs the abnormal load signal VF when the weight of the passenger is close to the lower limit value of the passenger weight load range and the load detected by the load sensor 20 becomes a collision load below the lower limit value of the passenger weight load range minus L2. Thus, the abnormal deformation of each of the bend parts 18a and 19a of the brackets 18 and 19 caused by the abnormal load out of the passenger weight load range set for each load sensor 20 can be detected more reliably.

According to the embodiment described above in detail, the following advantages can be provided:

(1) When the load applied to each of the brackets 18 and 19 is a load within the passenger weight load range, the corresponding signal processor 21 outputs the load detection signal VD responsive to the load. On the other hand, when the load is a collision load set in a load region out of the passenger weight load range, the signal processor 21 outputs the abnormal load signal VF different from the load detection signal VD. Thus, even when a weak shock is applied to the vehicle as in a collision at low speed, the load based on the weight of the passenger is close to the upper or lower limit value of the passenger weight load range and thus when the collision load is applied to each of the bend parts 18a and 19a of the brackets 18 and 19, the abnormal load signal VF different from the load detection signal VD is output.

Therefore, the fact that the collision load largely exceeding or below the passenger weight load range is applied to each of the bend parts 18a and 19a of the brackets 18 and 19 is detected more reliably. Thus, controlling the air bag system, for example, based on the load detected by the load sensor 20 in response to the bend deformation of the bend part 18a, 19a once abnormally deformed is suppressed and air bag control with poor accuracy based on the detection value of the load containing an error from the actual load is not performed.

(2) Since the load detection signal VD and the abnormal load signal VF that can be distinguished from each other are output to the same output terminal 21a, the number of wirings for electrically connecting to the ECU 22 is lessened as compared with the case where the signals VD and VF are output to separate output terminals. Therefore, the connector of wiring for connecting each connection part of the signal processor 21 and the ECU 22 may be smaller.

(3) The load detection signal VD clamped in the voltage range corresponding to the passenger weight load range is generated within the reference voltage VS by the clamp circuit 25. On the other hand, the abnormal load signal VF is output to the same output terminal 21a as a voltage signal out of the voltage range. Thus, the load detection signal VD can be output in a larger voltage range within the range of the reference voltage VS. Therefore, the resolution of the load detection signal VD can be made higher.

Second Embodiment

Next, a second embodiment of the invention will be discussed with reference to FIGS. 6 and 7. The second embodiment differs from the first embodiment in that the signal range clamped by the clamp circuit 25 of the signal processor 21 in the first embodiment is changed and that the output circuit 28 in the first embodiment is changed to an output circuit 51. Parts identical with those in the first embodiment previously described with reference to FIGS. 1 to 5 are denoted by the same reference numerals in FIGS. 6 and 7 and will not be discussed again. Only the clamp circuit 25 and the output circuit 51 will be discussed in detail. In the second embodiment, comparators 26 and 27 and the output circuit 51 make up an abnormal load detector.

The clamp circuit 25 outputs a load detection signal VD provided by clamping a voltage signal VC equal to or less than an upper limit voltage V3 set to a value close to a reference voltage VS. In the embodiment, the load detection signal VD is a first load detection signal and the upper limit voltage V3 is a second load detection signal.

Figure 6:
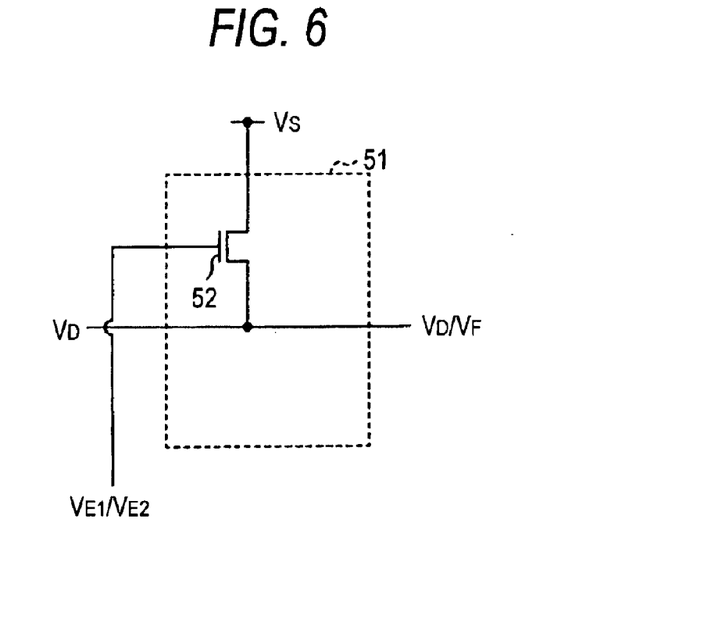
FIG. 6 is a schematic circuit diagram of an output circuit in a second embodiment of the invention.

The output circuit 51 includes a p-channel field effect transistor (PFET) 52 for performing switching operation according to determination signals VE1 and VE2 output by the comparators 26 and 27, as shown in FIG. 6. In the embodiment, the PFET 52 is used as a switching element, but may be a p-channel switching element.

The PFET 52 has a drain connected to a power line and a source connected to the output of the clamp circuit 25. The PFET 52 has a gate connected to the outputs of the comparators 26 and 27. When either of the determination signals VE1 and VE2 is a low potential, the PFET 52 is turned on. When the determination signals VE1 and VE2 are a high potential, the PFET 50 is turned off.

When the determination signal VE1 output by the comparator 26 and the determination signal VE2 output by the comparator 27 are a high potential, the output circuit 51 outputs the load detection signal VD output by the clamp circuit 25 to an output terminal 21a. When at least either of the determination signals VE1 and VE2 is a low potential, the output circuit 51 outputs an abnormal load signal VF of almost the reference voltage VS to the output terminal 21a. The abnormal load signal VF becomes a voltage value of almost 4.8 V or more due to a voltage drop in the PFET 52. In the embodiment, the abnormal load signal VF of almost the reference voltage VS is a third load detection signal.

Figure 7:
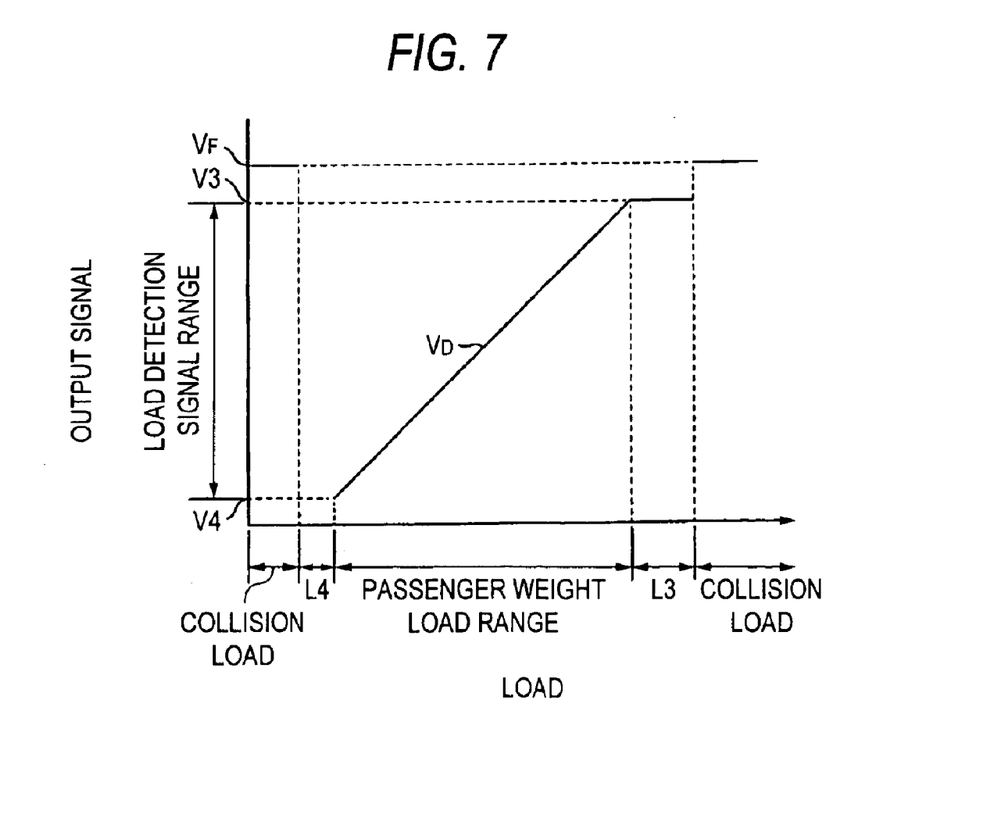
FIG. 7 is a graph to show a schematic characteristic of output signal-load of a passenger weight measuring apparatus in the second embodiment of the invention.

When the load applied to the corresponding load sensor 20 in response to the weight of the passenger sit in a seat 10 is a load within the passenger weight load range, the described signal processor 21 outputs a load detection signal VD which becomes a voltage value in the voltage range of a voltage value V4 larger than ground potential by one voltage value to the upper limit voltage V3, as shown in FIG. 7.

When the load applied to the load sensor 20 is a collision load set in a load region equal to or more than the load value larger than the upper limit value of the passenger weight load range by a given load value L3, the signal processor 21 outputs an abnormal load signal VF larger than the upper limit voltage V3. Likewise, when the load is a collision load set in a load region equal to or more than the load value larger than the lower limit value of the passenger weight load range by a given load value L4 on the negative side, the signal processor 21 also outputs an abnormal load signal VF.

The load detection range of the load value L3 exceeding the passenger weight load range and the load detection range of the load value L4 below the passenger weight load range are set so as not to erroneously determine that the collision load is applied when the load is increased or decreased because of hard acceleration or hard deceleration of the vehicle like the load detection ranges of the load values L1 and L2 in the first embodiment.

The described embodiment has similar functions to those of the first embodiment.

According to the second embodiment described above in detail, the advantages described above in (1) to (3) in the first embodiment can also be provided.

Embodiments other than the described embodiments are itemized as follows:

The clamp circuit 25 for clamping the magnitude range of the voltage signal VC output by the amplification circuit 24 in the magnitude range of the voltage signal VC corresponding to the passenger weight load range in the described embodiments is not provided and the voltage signal VC is output intact from a first output terminal. The output circuit 28, 51 outputs the abnormal load signal VF generated based on the determination signals VE1 and VE2 of the comparators 26 and 27 from a second output terminal provided aside from the first output terminal. Also in this case, the abnormal deformation of the bend part 18a, 19a caused by the collision load out of the passenger weight load range can be detected more reliably.

The load deformation bodies in the described embodiments may be elastic bodies (skew members) of load cells placed so as to support the seat and the load detector may be strain gauges placed on the elastic bodies. Also in this case, the abnormal deformation of the bend part 18a, 19a caused by the collision load out of the passenger weight load range can be detected more reliably.

The resistor strain gauges in the described embodiments may be any such as bonded wire type strain gauges, thick-film resistor strain gauges, metal foil type strain gauges, or semiconductor strain gauges.

An abnormal load sense apparatus is configured for outputting no load detection signal VD when a load in the passenger weight load range is applied and outputting only the abnormal load signal VF when a collision load is applied based on the voltage signal VA output in response to the load applied to the load sensor 20. Such a configuration also makes it possible to more reliably detect an abnormal load being applied to each of the bend parts 18a and 19a of the brackets 18 and 19.

The technical philosophy understood from the embodiments described above are described together with the advantages:

(1) An abnormal load sense apparatus including a load sensor for detecting the distortion deformation amount of a load deformation body to which a load based on the weight of a passenger is applied, the load deformation body becoming elastically deformed according to the distortion deformation amount responsive to the magnitude of the applied load, and generating and outputting a load detection signal corresponding to the load from the distortion deformation amount, and an abnormal load detector for outputting an abnormal load detection signal when an abnormal load set in a load region out of a preset passenger weight load detection range for the load is applied to the load deformation body based on the load detection signal. Such a configuration makes it possible to more reliably detect an abnormal load being applied to the load detection part because of a collision of the vehicle, etc.

According to the invention, an abnormal load being applied the load detection part because of a collision of the vehicle, etc., can be detected more reliably.

What is claimed is:

1. A passenger weight measuring apparatus comprising:
    a load detector for detecting the distortion deformation amount of a load deformation body to which a load based on the weight of a passenger is applied, the load deformation body becoming elastically deformed according to the distortion deformation amount responsive to the magnitude of the applied load, to generate and output a load detection signal corresponding to the load from the distortion deformation amount;
    an abnormal load detector for outputting an abnormal load detection signal in a state in which the abnormal load detection signal is distinguishable from the load detection signal when an abnormal load set in a load region out of a preset passenger weight load detection range for the load is applied to the load deformation body; and
    a clamp circuit for clamping the load detection signal output by the load detector in the signal range corresponding to the passenger weight load detection range,
    wherein the abnormal load detector outputs the abnormal load detection signal as a signal out of the signal range.

2. The passenger weight measuring apparatus as claimed in claim 1, wherein the abnormal load detection signal comprises a signal that is distinguishable from the load detection signal; and
    wherein the abnormal load detector outputs the abnormal load detection signal to an output terminal to which the load detector outputs the load detection signal.

3. The passenger weight measuring apparatus as claimed in claim 2 wherein the abnormal load detector comprises:
    a comparison determination circuit for determining whether or not the load detection signal is out of a signal range corresponding to the passenger weight load detection range by comparing the load detection signal with a preset reference signal, to output a determination signal corresponding to the determination result; and
    an output circuit being responsive to the determination signal for outputting the load detection signal to the output terminal when the load detection signal is within the signal range and outputting the abnormal load detection signal to the output terminal when the load detection signal is out of the signal range.

4. The passenger weight measuring apparatus as claimed in claim 3 wherein the output circuit comprises a switching element for performing switching operation in response to the determination signal and when the load detection signal is out of the signal range, the switching element outputs one of a power supply potential signal and a ground potential signal to the output terminal as the abnormal load detection signal.

5. The passenger weight measuring apparatus as claimed in claim 1, wherein the load deformation body comprises a support member for supporting a seat in which a passenger sits to a vehicle main body side, and
    wherein the load detector comprises a resistor strain gauge placed on the support member.

6. A passenger weight measuring apparatus comprising:
    a load deformation body being distorted and deformed upon application of a load thereto;
    a load detector for detecting the load from the distortion deformation amount occurring on the load deformation body; and
    an abnormal load detector for setting a passenger weight load range for the load from the load detector, outputting a first load detection signal responsive to the load if the load from the load detector is in the passenger weight load range, outputting a second load detection signal provided by clamping the first load detection signal when a positive load of a predetermined load from the upper limit value of the passenger weight load range is detected or when a negative load of a predetermined load from the lower limit value of the passenger weight load range is detected, and outputting a third load detection signal which becomes a power supply potential signal or a ground potential signal when any other load is detected.

7. A passenger weight measuring apparatus comprising:
    a load deformation body being distorted and deformed upon application of a load thereto;
    a load detector for detecting the load from the distortion deformation amount occurring on the load deformation body;
    an abnormal load detector for setting for the load a passenger weight load range assumed to be a passenger weight load and an abnormal load range in which a positive load out of the upper limit value of the passenger weight load by a predetermined load is detected or a negative load out of the lower limit value of the passenger weight load by a predetermined load is detected, and outputting to an output terminal an abnormal load detection signal different from a load detection signal changing with the distortion deformation amount in the passenger weight load range if a load in the abnormal load range is detected; and
    a clamp circuit for clamping the load detection signal output by the load detector in the signal range corresponding to the passenger weight load detection range,
    wherein the abnormal load detector outputs the abnormal load detection signal as a signal out of the signal range.

8. The passenger weight measuring apparatus as claimed in claim 7 wherein the abnormal load detector comprises:

a comparison determination circuit for comparing the load from the distortion deformation amount with a reference signal to output a determination signal if the load is determined to be in the abnormal load range; and an output circuit for outputting the abnormal load detection signal to the output terminal if the load is in the abnormal load range.

9. The passenger weight measuring apparatus as claimed in claim 3 wherein the output circuit comprises a switching element for performing switching operation in response to the determination signal and if the load is in the abnormal load range, the switching element outputs a power supply potential signal or a ground potential signal to the output terminal as the abnormal load detection signal.

10. The passenger weight measuring apparatus as claimed in claim 9 wherein the abnormal load detector further comprises a clamp circuit for placing a load between the passenger weight load range and the abnormal load range in a load detection signal range.

11. The passenger weight measuring apparatus as claimed in claim 10 wherein the load deformation body comprises a support member for supporting a seat in which a passenger sits to a vehicle main body side, and wherein the load detector is a resistor strain gauge placed on the support member.

12. A passenger weight measuring apparatus comprising:

a load detector for detecting the distortion deformation amount of a load deformation body to which a load based on the weight of a passenger is applied, the load deformation body becoming elastically deformed according to the distortion deformation amount responsive to the magnitude of the applied load, to generate and output a load detection signal corresponding to the load from the distortion deformation amount;

an abnormal load detector for outputting an abnormal load detection signal in a state in which the abnormal load detection signal is distinguishable from the load detection signal when an abnormal load set in a load region out of a preset passenger weight load detection range for the load is applied to the load deformation body;

wherein the abnormal load detection signal comprises a signal that is distinguishable from the load detection signal;

wherein the abnormal load detector outputs the abnormal load detection signal to an output terminal to which the load detector outputs the load detection signal; and a clamp circuit for clamping the load detection signal output by the load detector in the signal range corresponding to the passenger weight load detection range, wherein the abnormal load detector outputs the abnormal load detection signal as a signal out of the signal range.

13. The passenger weight measuring apparatus as claimed in claim 12 wherein the abnormal load detector comprises:

a comparison determination circuit for determining whether or not the load detection signal is out of a signal range corresponding to the passenger weight load detection range by comparing the load detection signal with a preset reference signal, to output a determination signal corresponding to the determination result; and an output circuit being responsive to the determination signal for outputting the load detection signal to the output terminal when the load detection signal is within the signal range and outputting the abnormal load detection signal to the output terminal when the load detection signal is out of the signal range.

14. The passenger weight measuring apparatus as claimed in claim 13 wherein the output circuit comprises a switching element for performing switching operation in response to the determination signal and when the load detection signal is out of the signal range, the switching element outputs one of a power supply potential signal and a ground potential signal to the output terminal as the abnormal load detection signal.

15. The passenger weight measuring apparatus as claimed in claim 12, wherein the load deformation body comprises a support member for supporting a seat in which a passenger sits to a vehicle main body side, and wherein the load detector comprises a resistor strain gauge placed on the support member.

16. The passenger weight measuring apparatus as claimed in claim 13 wherein the output circuit comprises a switching element for performing switching operation in response to the determination signal and if the load is in the abnormal load range, the switching element outputs a power supply potential signal or a ground potential signal to the output terminal as the abnormal load detection signal.

17. The passenger weight measuring apparatus as claimed in claim 16 wherein the abnormal load detector further comprises a clamp circuit for placing a load between the passenger weight load range and the abnormal load range in a load detection signal range.

18. The passenger weight measuring apparatus as claimed in claim 17 wherein the load deformation body comprises a support member for supporting a seat in which a passenger sits to a vehicle main body side, and wherein the load detector is a resistor strain gauge placed on the support member.

* * * * *